(12) United States Patent
Walter

(10) Patent No.: US 6,789,010 B2
(45) Date of Patent: Sep. 7, 2004

(54) AIRPORT MAP DISPLAY SYSTEM AND DATA INTERCHANGE METHOD

(75) Inventor: Randy L. Walter, Ada, MI (US)

(73) Assignee: Smiths Aerospace, Inc., Grand Rapids, MI (US)

(*) Notice: Subject to any disclaimer, the term of this patent is extended or adjusted under 35 U.S.C. 154(b) by 142 days.

(21) Appl. No.: 10/079,230

(22) Filed: Feb. 20, 2002

(65) Prior Publication Data

US 2003/0105581 A1 Jun. 5, 2003

Related U.S. Application Data

(60) Provisional application No. 60/336,752, filed on Dec. 4, 2001, provisional application No. 60/337,182, filed on Dec. 4, 2001, provisional application No. 60/337,192, filed on Dec. 4, 2001, and provisional application No. 60/337,295, filed on Dec. 4, 2001.

(51) Int. Cl.[7] ............................................... G02F 19/00
(52) U.S. Cl. .................... 701/120; 701/208; 701/213; 701/300; 701/301
(58) Field of Search ............................. 701/120, 121, 701/122, 207, 208, 213, 300, 301, 302; 340/951

(56) References Cited

U.S. PATENT DOCUMENTS

| | | | |
|---|---|---|---|
| 3,706,969 A | 12/1972 | Paredes | 340/26 |
| 3,971,025 A | 7/1976 | Levine | 343/108 |
| 4,151,595 A | 4/1979 | Pressiat | 364/439 |
| 4,876,651 A | 10/1989 | Dawson et al. | 364/449 |
| 5,057,835 A | 10/1991 | Factor et al. | 340/995 |
| 5,200,902 A | 4/1993 | Pilley | 364/439 |
| 5,268,698 A | 12/1993 | Smith, Sr. et al. | 342/450 |
| 5,343,395 A | 8/1994 | Watts | 364/428 |
| 5,519,618 A | 5/1996 | Kastner et al. | 364/439 |
| 5,629,691 A | 5/1997 | Jain | 340/961 |
| 5,745,054 A | 4/1998 | Wilkens | 340/972 |
| 5,831,570 A | 11/1998 | Ammar et al. | 342/26 |
| 5,913,912 A | 6/1999 | Nishimura et al. | 701/35 |
| 5,978,715 A | 11/1999 | Briffe et al. | 701/11 |
| 6,018,698 A | 1/2000 | Nicosia et al. | 701/214 |
| 6,112,141 A | 8/2000 | Briffe et al. | 701/14 |
| 6,144,915 A | 11/2000 | Shiomi et al. | 701/120 |
| 6,157,876 A | 12/2000 | Tarleton, Jr. et al. | 701/16 |
| 6,195,609 B1 | 2/2001 | Pilley et al. | 701/120 |
| 6,246,342 B1 | 6/2001 | Vandevoorde et al. | 340/961 |
| 6,282,488 B1 | 8/2001 | Castor et al. | 701/120 |
| 6,314,363 B1 | 11/2001 | Pilley et al. | 701/120 |
| 6,314,370 B1 | 11/2001 | Curtright | 701/213 |
| 6,353,794 B1 | 3/2002 | Davis et al. | 701/201 |
| 6,411,890 B1 | 6/2002 | Zimmerman | 701/120 |
| 6,453,231 B1 | 9/2002 | Ooga | 701/120 |
| 6,463,383 B1 | 10/2002 | Baiada et al. | 701/120 |
| 6,553,307 B2 * | 4/2003 | Stratton et al. | 701/120 |
| 2001/0049580 A1 | 12/2001 | Kusano et al. | 701/200 |

* cited by examiner

Primary Examiner—Richard M. Camby
(74) Attorney, Agent, or Firm—Price, Heneveld, Cooper, DeWitt & Litton, LLP

(57) ABSTRACT

An airport map display system provides situational awareness to a pilot of an airport's runways, taxiways, and other features relative to the pilot's aircraft. Data representative of an airport map is translated and communicated between aircraft systems using a data interchange method that facilitates efficient throughput of information used to represent an airport map. In addition, data representative of taxi routes, modified taxi routes, and current position of the aircraft at the airport are also translated and communicated using a compact data interchange method. Airport map data is scaled so that it is compatible with display systems previously incompatible with displaying some airport maps. Aircraft equipped with raster displays are manipulated to display map symbology by redefining existing vector group labels. For retrofit applications, the airport map display system is activated when a preexisting input (e.g., an "ARPT" button) is activated when a taxi-related page is active.

8 Claims, 4 Drawing Sheets

FIG. 2

| WORD # | SS M | DATA | RANGE | RESOLUTION | LABEL |
|---|---|---|---|---|---|
| 1 | 01 | LATITUDE POINT 1 | 20 BITS | .00017 DEG | 100 FOR ACT TAXI PATH |
| 2 | 00 | LONGITUDE POINT 1 | 20 BITS | .00017 DEG | |
| 3 | 00 | LATITUDE POINT 2 | 20 BITS | .00017 DEG | 300 FOR MOD TAXI PATH |
| 4 | 00 | LONGITUDE POINT 2 | 20 BITS | .00017 DEG | |
| 5 | 11 | CONIC SUBTENDED ANGLE | 12 BITS | .0439 DEG | |
| 6 | 11 | CONIC RADIUS | 15 BITS | .0078125 nm | |
| 7 | 11 | CONIC INITIAL ANGLE | 12 BITS | .0439 DEG | 040 FOR TAXIWAY |
| 10 | 00 | LATITUDE POINT 3 | 20 BITS | .00017 DEG | 300 FOR RUNWAY |
| 11 | 00 | LONGITUDE POINT 3 | 20 BITS | .00017 DEG | |
| .. | .. | .. | | | |
| N | 00 | LATITUDE POINT 1 | 20 BITS | .00017 DEG | |
| N+1 | 10 | LONGITUDE POINT 1 | 20 BITS | .00017 DEG | |

FIG. 3

| WORD # | SS M | DATA | RANGE | RESOLUTION | LABEL |
|---|---|---|---|---|---|
| 1 | 01 | LATITUDE | 20 BITS | .00017 DEG | 104 FOR RUNWAY IDENT |
| 2 | 00 | LONGITUDE | 20 BITS | .00017 DEG | 004 FOR RUNWAY IDENT |
| 3 | 00 | TEXT (3 ASCII) | 7 BITS EACH | — | |
| 4 | 10 | TEXT (3 ASCII) | 7 BITS EACH | — | |

1. ΔLat = (Lat − Ref Lat) × Earth Radius

2. ΔLon = (Lon − Ref Lon) × Cos ((Lat + RefLat)/2)

3. Course = Arctan (ΔLon/ΔLat)

4. Distance = Sqrt(ΔLat² + ΔLon²)

5. Scale = Distance × 10

6. New Lat = Ref Lat + Scale × Cos(Course)/Earth Radius

7. New Lon = Ref Lon + Scale × Sin (Course)/
(Earth Radius × Cos ((Ref Lat + New Lat)/2)

FIG. 4

AIRPORT MAP DISPLAY SYSTEM AND DATA INTERCHANGE METHOD

CROSS-REFERENCE TO RELATED APPLICATIONS

This application claims the benefit of U.S. Provisional Application Nos. 60/336,752; 60/337,182; 60/337,192; and 60/337,295, all filed Dec. 4, 2001, the disclosure of each of which are hereby incorporated by reference.

BACKGROUND OF THE INVENTION

1. Field of the Invention

The present invention relates to aircraft surface guidance systems (SGS) and, in particular, to a communications interchange for transmitting airport map data to a display system on an aircraft.

2. Technical Background

There is considerable interest in enhancing the field surface guidance for aircraft. After an aircraft lands on a runway at an airport, the next step is to taxi the aircraft to a desired destination such as a passenger loading/unloading gate. A pilot can easily become confused or lost amid the many runways, taxiways, ramps, and buildings that make up an airport. The problem is more significant at large airports and is particularly significant at night when the multitude of lights can make it more difficult to taxi the aircraft to the desired destination.

Efficient taxi operations save time and money. With airports becoming more crowded, aircraft often spend considerable time taxiing between runways and gates. Taxi time is even longer if the pilot makes a wrong turn, becomes lost, or blunders onto the wrong runway or taxiway. In addition, a wrong turn or navigation blunder can cause delays for other aircraft at the airport.

A main feature of an airport surface guidance capability is the presentation of an airport map that is readily available to the pilot. One conventional approach to present such a map is on a head-down display (HDD) that is displayed in the forward field of view of the pilot. The pilot typically enters or selects a taxi path that has been approved by ground controllers. The airport map then indicates the current aircraft position and the taxi path is shown overlaid on the airport map. The map gives a pilot situational awareness of where the aircraft is relative to the taxi instructions. A key aspect to a practical avionics implementation for surface guidance must generally include a communications bus or data link for transmitting the large amounts of data typically required to adequately represent an airport map on a display screen.

An obstacle for the practical implementation of an airport map system is the requirement to clearly display an airport map, preferably with taxi paths and current aircraft position overlaid on the map. Prior avionics systems have attempted to display airport maps by storing the airport map as a digital picture. While this approach works, representation of the airport map in this manner requires large amounts of memory for each airport. A digital representation of an airport map can consume more than one gigabyte of memory. In addition, such digital maps require a correspondingly high speed communications bus to transmit the map data to a display system. This requirement, coupled with the fact that many avionics systems have limited data storage capability and do not have high speed buses, have stymied efforts to implement airport maps on many aircraft. Another approach for displaying airport maps has been to upgrade aircraft avionics systems with new equipment that has large data storage capability and high speed data buses. However, these systems must be designed, certified, integrated with the exiting avionics suite, and installed. All this makes such an upgrade very costly and, therefore, this approach is economically infeasible for many aircraft.

Any airport map system should be adequate not only to accomplish the task of displaying airport maps, but to also make the maps useful and cost-effective. It is also desirable to design a map system that may be retrofit into existing aircraft avionics systems.

The continuing goal, therefore, is to find ways to reduce costs, reduce taxi errors, reduce taxi time, and improve airport efficiency.

SUMMARY OF THE INVENTION

To address the goals stated above and other goals, the inventive airport map display system comprises a unique data interchange method for facilitating the communication of airport map data through existing data buses without the need to design or install new high speed data buses. The airport map display system of the current invention also translates map data into a scale that is more user friendly on certain existing display systems. When the invention is implemented using a raster type display system for displaying the airport map data, the vector group labels are redefined to display airport map symbology as opposed to enroute symbology. For retrofit applications, the airport map display system is activated responsive to a preexisting dual use input activated when a taxi-related page is being displayed.

According to one aspect of the present invention, the airport map display system is integrated as an extension of the flight management system (FMS) which provides the enroute planning function for the aircraft. FMSs are already installed in many aircraft and an FMS comprises many of the components required to implement the airport map display system of the invention. For example, an FMS may comprise a processor, data storage devices, a user interface, and is typically in communication with multiple display systems.

In another aspect of the present invention, the airport map data is translated into a scale that is compatible with a target display system. In this manner, the airport map display system of the invention is compatible with a larger selection of preexisting display systems.

Yet another aspect of the invention is the manipulation of raster display interfaces of existing systems by redefining the vector group labels to facilitate the display of airport map symbology.

It is clear that the invention is a significant improvement over the prior art systems. Further, those skilled in the art will recognize that the invention is not limited to use with an FMS. It should be appreciated that other processors, display screens, and data entry devices may be used to practice the present invention.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 2 is a sample interface definition according to the invention;

FIG. 3 is a sample surface identification format according to the invention;

FIG. 4 is a flowchart illustrating a sample scaling algorithm according to the invention.

DETAILED DESCRIPTION OF THE PREFERRED EMBODIMENTS

Figure 1:
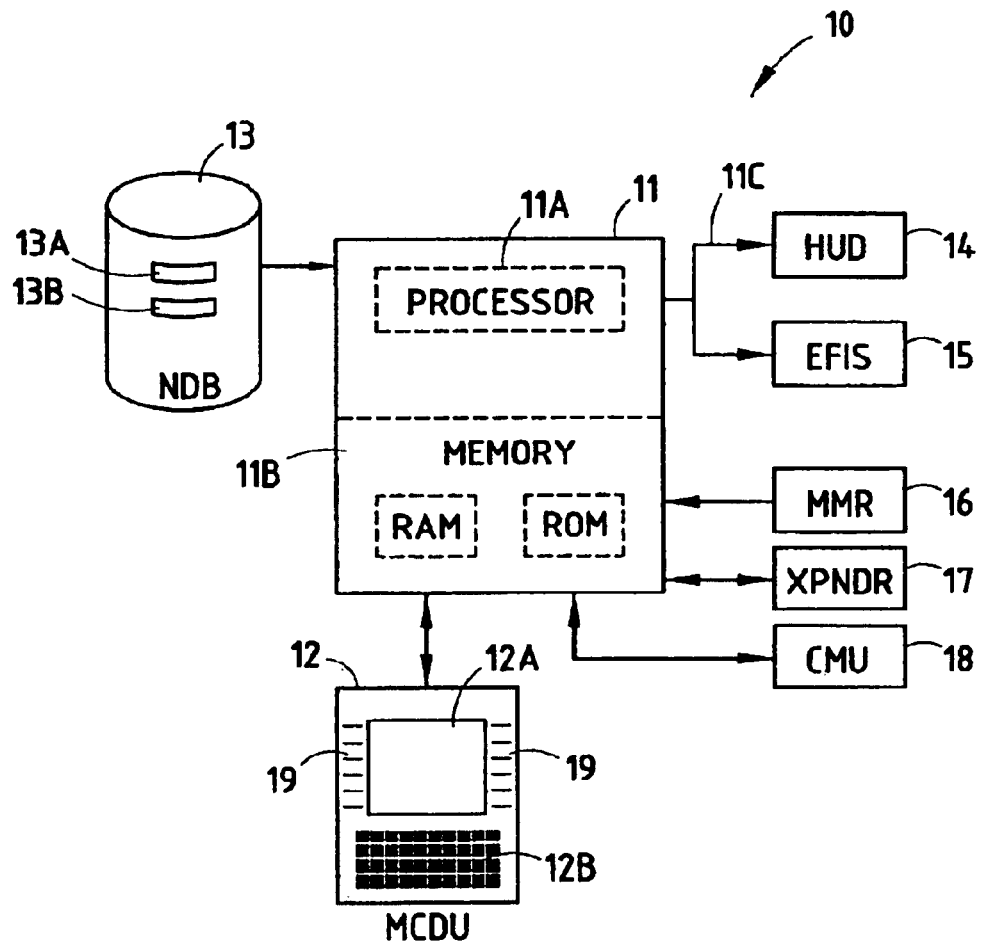
FIG. 1 is a block diagram of one embodiment of an airport map display system according to the invention.

Reference will now be made in detail to the present preferred embodiments of the invention, examples of which are illustrated in the accompanying drawings. Wherever possible, the same reference numerals will be used throughout the drawings to refer to the same or like parts.

Referring to FIG. 1, an exemplary embodiment of the airport map system according to the present invention is shown, and is designated generally throughout by reference numeral 10. The components of the airport map system of the present invention will first be briefly described and then described in detail. The most common use for the invention is as an integrated element in the FMS of an aircraft, such as a commercial passenger or cargo jet, and therefore the following discussion will describe the invention in relation to such an application.

A block diagram of the airport map system according to the invention and related aircraft systems is shown in FIG. 1. All of the various aircraft systems can comprise the invention and therefore they are collectively referred to as airport map display system 10.

Airport map display system 10 comprises flight management computer (FMC) 11, multifunction control display unit (MCDU) 12, navigation database (NDB) 13, head-up display (HUD) 14, electronic flight instrument system (EFIS) 15, multi-mode receiver (MMR) 16, transponder 17, and communications management unit (CMU) 18. FMC 11 and MCDU 12 are generally referred to collectively as a flight management system (FMS).

FMC 11 comprises a processor 11A, and memory 11B. Processor 11A may include any data processor suitable for receiving and processing commands and data. Processor 11A is preferably a microprocessor with sufficient throughput to complete the required FMS and airport map tasks in real-time. Memory 11B preferably comprises both random access memory (RAM) for storing dynamic data and variables, and read-only memory (ROM) for storing program data and static data. Processor 1 A communicates with memory 11B to retrieve program instructions and data and to manipulate and store variables. Processor 11A is also in communication with NDB 13.

NDB 13 comprises airport map data and taxi route data describing airport runways, taxiways, gates, ramps, standard taxi routes and various other desired airport structures or features as desired. The airport map data is preferably stored in the linked list 13A and standard taxi routes 13B are also stored in the database. However, the airport map data may also be stored in many other formats as desired. NDB 13 is preferably rewritable or replaceable so that the data representative of an airport map and standard taxi route data is easily updated as needed and so that the data remains current regarding changes to airport runways, taxiways, construction, and the like. NDB 13 is constructed of any of various memory storage technologies such as PROM, EPROM, EEPROM, magnetic disk drives, optical disk drives, or various combinations of these and similar devices. The operative requirement merely being the capability to store the data representative of an airport map.

The user interface is preferably accomplished through MCDU 12 which communicates with FMC 11 and processor 11A. MCDU 12 comprises a display screen 12A, line select keys 19, and a key pad 12B. MCDU 12 is commonly used to enter enroute flight planning commands to the FMC 11 and to output enroute flight data to the pilot, crew, or operator via display screen 12A. The operation of line select keys 19 allows quick selection and deletion of displayed items. According to one embodiment, the invention uses this pre-existing user interface device to accomplish the user interface for ground navigation at airports, although other user interfaces may also be used to practice the invention. For example, other displays such as the EFIS 15 or HUD 14 may be used as part of the user interface if desired since these systems also have user interfaces.

HUD 14 and EFIS 15 are shown in communication with FMC 11 via display signal 11C. HUD 14 projects an image to a combiner positioned along the forward line of sight of the pilot such that a pilot can view the image and also look out the front windshield of the aircraft simultaneously. EFIS 15 (also referred to as a HDD) is typically positioned below the front windshield of the aircraft. EFIS 15 comprises one or more display screens which are typically implemented using cathode ray tubes (CRTs), flat panel displays, or functionally similar display devices. Once the airport map is selected, the map is preferably displayed to the pilot on either the HUD 14 or EFIS 15. The EFIS 15 is the more preferred display device. The EFIS 15, HUD 14, and MCDU 12 each have display screens that may be used to practice the invention.

Several communications systems are also coupled to the FMC 11. MMR 16 receives navigation or position signals such as global positioning system (GPS) signals, differential GPS (DGPS), local area augmentation system (LAAS) signals, wide area augmentation system (WAAS) signals, and the like. These signals are communicated to the FMC 11 where the position of the aircraft relative to airport features is determined. This aircraft position information or similar information from other sources, is then used to compute an appropriate display signal 11C.

Transponder 17 and CMU 18 provide additional input and output communications channels. Transponder 17, for example, may receive signals such as automatic dependent surveillance broadcast (ADS-B) from other aircraft or air traffic control (ATC). This information may be used to add the position of other vehicles to the displayed airport map. CMU 18 comprises a data link with ATC or similar controlling authority through which taxi routes, plans and instructions are communicated, negotiated, modified, and approved or denied.

There exist many standards related to communications in the aviation industry, and particularly in the field of avionics. Aeronautical Radio, Inc. (ARINC), of 2551 Riva Road, Annapolis, Md., publishes a variety of standards relating to avionics. Two such publications disclose aviation communications standards. ARINC 429 is a standard relating to a communications bus frequently used on aircraft. ARINC Characteristic 702A, entitled "Advanced Flight Management Computer System" was published Dec. 31, 1996, and relates to, among other things, the communication protocols between an FMS and a display system. Both of these aforementioned publications are hereby incorporated by reference.

FIG. 2 is a sample interface definition according to the invention. In order to utilize existing EFIS interfaces on aircraft, the taxi path and airport map features utilize the existing vector group labels. These labels were intended for other purposes such as for displaying enroute symbology. The airport map display system uses these vector group labels to represent the taxi path (both active and modified) and the airport map (e.g., runways and taxiways). The active and modified flight plan labels are used for the taxi route and modified taxi route respectively. Similarly, the offset flight plan label is used for the airport map symbology. The airport map depicts the pavement outlines and may also include conic sections to depict various curved pavement areas. The positions (i.e., position locations or coordinates) are absolute latitude/longitude position coordinates which may use twenty (20) bits of data in the BNR format that is referenced in the ARINC specifications. FIG. 3 illustrates a sample format for surface identifiers. Preferably, this includes text identifiers for runways and taxiways (e.g., R25, B42).

FIG. 4 illustrates one algorithm for transposing latitude and longitude coordinates to affect the expanded scaling required for the airport map data presentation. Formula 1 calculates Δ (delta) latitude from the absolute latitude and the reference latitude (i.e., the aircraft latitude) and then multiplied by an Earth radius constant. Formula 2 calculates Δ longitude from the reference longitude and the reference latitude. Course is computed from the Δ latitude and Δ longitude. Distance is computed from Δ latitude and Δ longitude. Scale is computed from distance times ten (10) to achieve a scaling factor of ten (10). Other scaling factors may be achieved by using other multipliers as desired. The new latitude and new longitude position coordinates are computed as shown in formulas 6 and 7 in FIG. 4.

Figure 6:
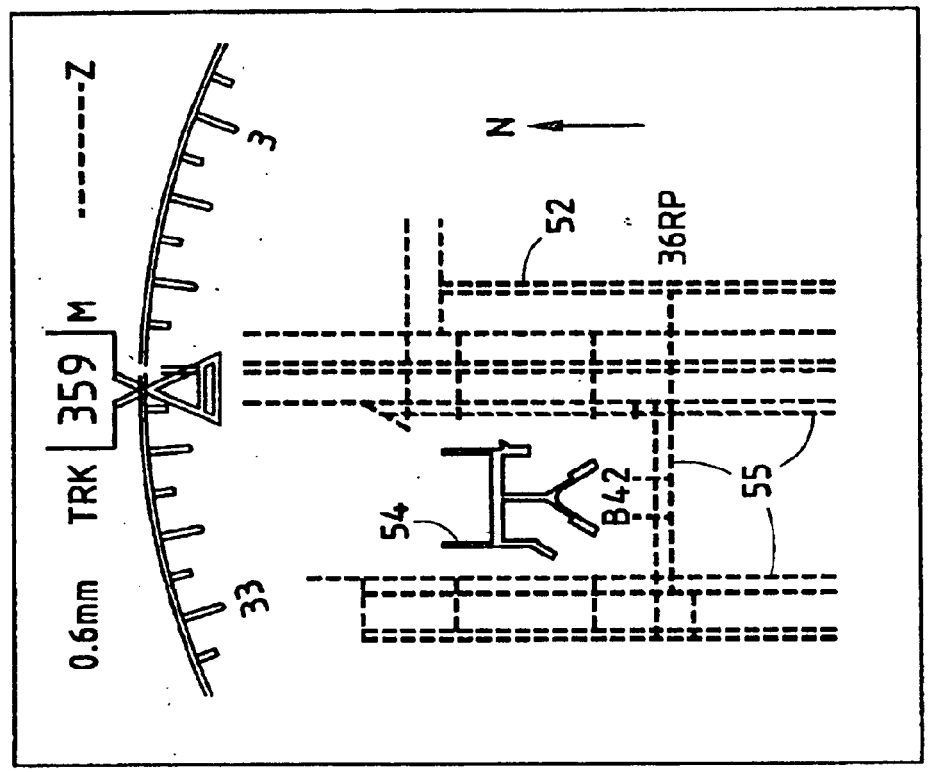
FIGS. 5 and 6 are airport map display screens according to the invention.
Figure 5:
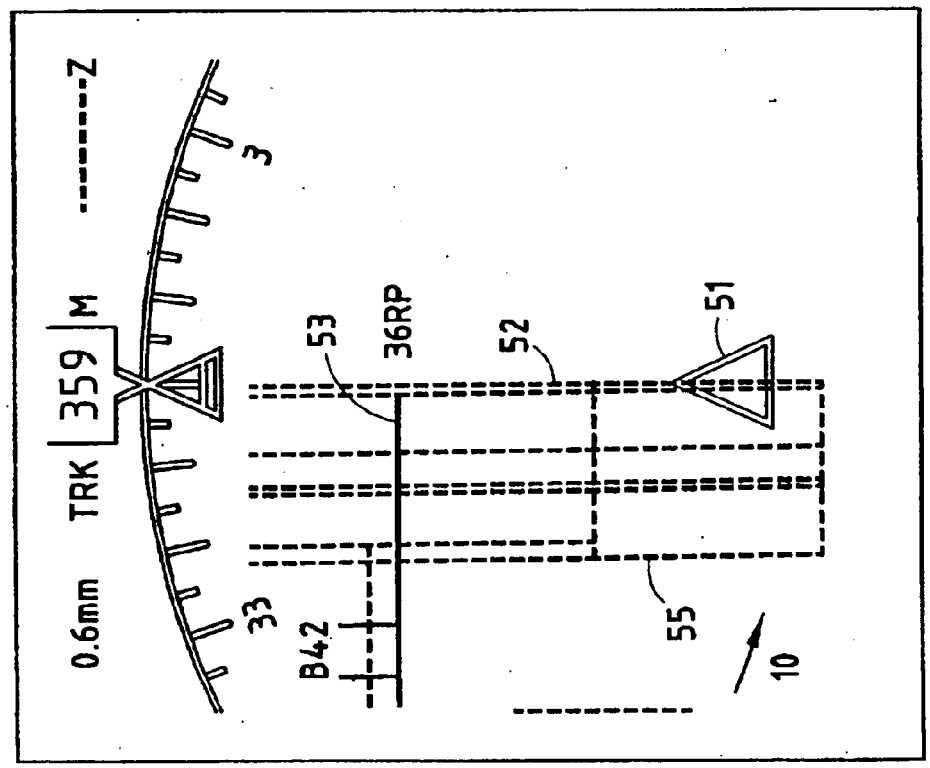

FIGS. 5 and 6 illustrate resulting displays according to the invention. Aircraft symbology 51 is shown on runway 52. Runway 52 is indicated by two parallel dashed lines. Taxi route 53 proceeds along runway 52 and turns left and proceeds along taxiway 55 to terminal building 54. Taxiways 55 are represented by single dashed lines. In use, the symbology is more discernable since the symbology may be displayed in different colors. For example, runways 52 may be displayed in white dashed lines, taxiways 55 may be displayed in blue dashed lines, and taxi routes 53 and buildings 54 may be displayed in solid magenta lines. FIG. 6 illustrates another resulting display embodied on an EFIS display screen and shown in a larger scale (i.e., a larger area of the airport is displayed).

It will become apparent to those skilled in the art that various modifications to the preferred embodiment of the invention as described herein can be made without departing from the spirit or scope of the invention as defined by the appended claims.

The invention claimed is:

1. A method of airport map data interchange in an aircraft comprising the steps of:

obtaining the coordinates of a reference location;

obtaining the coordinates of an airport structure;

communicating said reference location to a display device;

computing relative structure coordinates of the airport structure relative to said reference location;

scaling the relative structure coordinates;

converting the scaled relative structure coordinates to absolute position coordinates; and communicating said structure coordinates to said display device.

2. The method of airport map data interchange of claim 1, wherein said reference location is a portion of said aircraft.

3. The method of airport map data interchange of claim 1, wherein the step of scaling said relative structure coordinates comprises scaling as a function of reference coordinates and the airport feature coordinates.

4. The method of airport map data interchange of claim 1 further comprising the step of computing taxi route coordinates relative said reference location and communicating said taxi route coordinates to said display device.

5. The method of airport map data interchange of claim 1 further comprising the step of communicating said structure coordinates responsive to activation of an dual use input when a taxi-related page is displayed on a display screen.

6. A method of airport map data interchange in an aircraft comprising the steps of:

obtaining the coordinates of a reference location;

obtaining the coordinates of an airport structure;

computing relative coordinates of the airport structure relative to the reference location;

scaling the relative coordinates of the airport structure;

converting the scaled relative coordinates of the airport structure to absolute position coordinates; and displaying the absolute position coordinates on a display device.

7. The method as defined in claim 6 wherein the reference location is a portion of said aircraft.

8. The method as defined in claim 6 further comprising the step of: communicating said absolute position coordinates to a display device.

* * * * *